(12) United States Patent
Be et al.

(10) Patent No.: US 12,722,795 B2
(45) Date of Patent: Sep. 1, 2026

(54) ANGLE-OF-ATTACK SENSOR, IN PARTICULAR FOR AN AIRCRAFT

(71) Applicant: THALES, Meudon (FR)

(72) Inventors: Jocelyn Be, Vendome (FR); Jean-Philippe Pineau, Vendome (FR)

(73) Assignee: THALES, Meudon (FR)

( * ) Notice: Subject to any disclaimer, the term of this patent is extended or adjusted under 35 U.S.C. 154(b) by 252 days.

(21) Appl. No.: 18/576,125

(22) PCT Filed: Jul. 7, 2022

(86) PCT No.: PCT/EP2022/068984
§ 371 (c)(1),
(2) Date: Jan. 3, 2024

(87) PCT Pub. No.: WO2023/281013
PCT Pub. Date: Jan. 12, 2023

(65) Prior Publication Data

US 2024/0308682 A1 Sep. 19, 2024

(30) Foreign Application Priority Data

Jul. 7, 2021 (FR) ..................................... 21 07330

(51) Int. Cl.
*G01P 13/02* (2006.01)
*B64D 43/02* (2006.01)

(52) U.S. Cl.
CPC ............ *B64D 43/02* (2013.01); *G01P 13/025* (2013.01)

(58) Field of Classification Search
CPC ..................................................... G01P 13/025
See application file for complete search history.

(56) References Cited

U.S. PATENT DOCUMENTS 7,269,998 B2 * 9/2007 Hutson ..................... G01P 5/02 73/170.01
9,239,338 B2 * 1/2016 Daup ...................... G01P 13/02
9,884,685 B2 2/2018 Bartz et al.
2004/0261518 A1 * 12/2004 Seidel ..................... G01P 5/165 73/182
2011/0174050 A1 * 7/2011 Huertos Sanz ........ G01D 11/30 73/866.5
2015/0041451 A1 2/2015 Kriwan et al.
2015/0344137 A1 12/2015 Bartz et al.

(Continued)

FOREIGN PATENT DOCUMENTS

CN 203259541 10/2013
CN 104034301 9/2014
EP 3321187 B1 * 7/2019 ............. B64D 45/00

OTHER PUBLICATIONS

International Search Report for PCT/EP2022/068984 dated Sep. 23, 2022.

(Continued)

*Primary Examiner* — Herbert K Roberts
(74) *Attorney, Agent, or Firm* — B. Aaron Schulman, Esq.; Stites & Harbison, PLLC

(57) ABSTRACT

This angle-of-attack sensor, in particular for an aircraft, of the type including a sensor body (11) on which a wind vane (12) is mounted movable in rotation by a flow, is characterized in that the wind vane (12) includes at least one deflector (13, 14) extending from the leading edge of this wind vane over at least part of the intrados and/or extrados thereof.

9 Claims, 6 Drawing Sheets

(56) References Cited

U.S. PATENT DOCUMENTS

| | | | | |
|---|---|---|---|---|
| 2016/0033356 | A1 | 2/2016 | DeAngelo et al. | |
| 2019/0346479 | A1* | 11/2019 | Reid | G01P 13/025 |
| 2020/0371132 | A1* | 11/2020 | Shin | G01P 13/025 |
| 2021/0063431 | A1* | 3/2021 | Snyder | G01P 5/14 |
| 2021/0364542 | A1 | 11/2021 | Summers | |

OTHER PUBLICATIONS

Preliminary Search Report for FR 2107330 dated Feb. 24, 2022.

Light Sport And Ultralight Flyer. Angle of attack gauge, fuel sensor and fuel gauge, Belite Aircraft Instruments, (Feb. 2, 2015), Retrieved from the Internet: https://www.youtube.com/watch?v=VfOIKX6mDiM [retrieved on Sep. 16, 2022].

* cited by examiner

ANGLE-OF-ATTACK SENSOR, IN PARTICULAR FOR AN AIRCRAFT

The present invention relates to an angle-of-attack sensor, in particular for an aircraft.

More particularly, the invention relates to such an angle-of-attack sensor, of the type including a sensor body, on which a wind vane is mounted, movable in rotation by a flow.

A problem encountered in this type of application, and in particular on an aerodynamic profile (and even more so on a laminar profile) placed in a transonic flow, is the phenomenon of local overspeed, which can result in a sudden stall of the wing.

This stall is linked to the aerodynamic component parallel to the wingspan, which increases the resultant of the local velocity vector.

As a result, the flow becomes locally closer to the speed of sound, and sudden stall phenomena occur.

In the case of an AOA wind vane, the stall of the flow over the entire profile has a direct impact on the angle measurement error.

Depending on the on-board computers, this error leads to the measurement being rejected, thereby reducing the safety of the aircraft, which then finds itself in a degraded situation.

To compensate for this physical phenomenon, incidence sensor wind vanes commonly use swept canopies, which delay the risk of a sudden stall, but do not cancel it out.

In the case of an incidence sensor, this sweep also allows the aerodynamic focus to move backwards, which increases the aerodynamic lever arm in relation to the axis of rotation of the vane.

The aim of the invention is to further improve the solution to this problem.

To this end, the invention has as its object an incidence sensor, in particular for an aircraft, of the type including a sensor body on which a wind vane is mounted movable in rotation by a flow, characterized in that the wind vane includes at least one deflector extending from the leading edge of this wind vane over at least part of the lower and/or upper surface thereof.

Further features of the sensor according to the invention, taken alone or in combination:

- the wind vane has at least one deflector on its intrados and extrados;
- said at least one deflector extends over all or part of the wind vane chord;
- it includes means for heating at least one of these deflectors;
- the means for heating the or each deflector are associated with the means for heating the sensor;
- the means for heating the or each deflector are associated with the means for heating the sensor by thermal conduction.

The invention will be better understood on reading the following description, given by way of example only and made with reference to the appended drawings, on which:

FIGS. 1 and 2 illustrate an angle-of-attack sensor, in particular for an aircraft, designated by the general reference 1.

Figure 1:
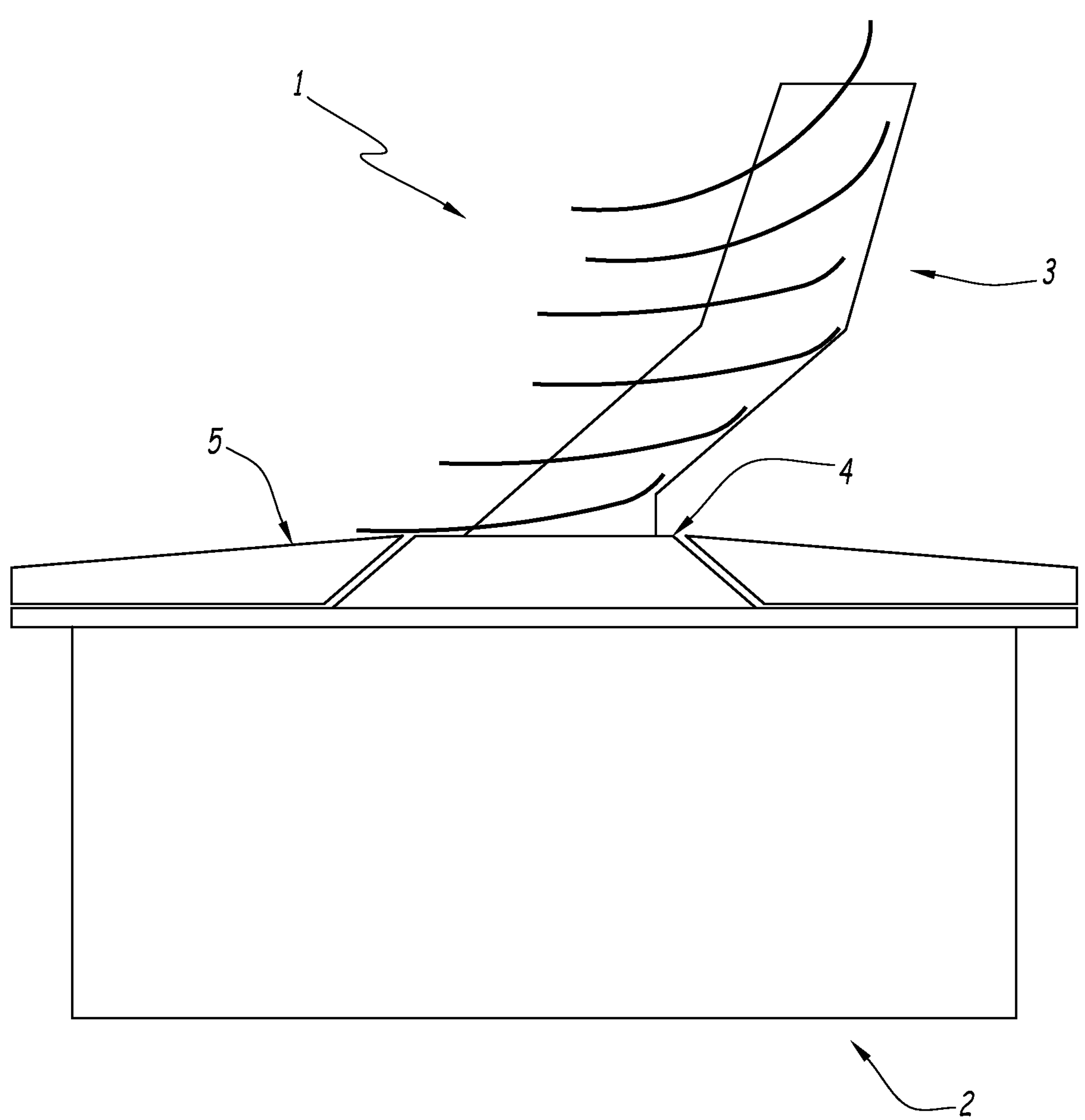
FIGS. 1 and 2 show side and front views, respectively, of an angle-of-attack sensor of the state of the art.
Figure 2:
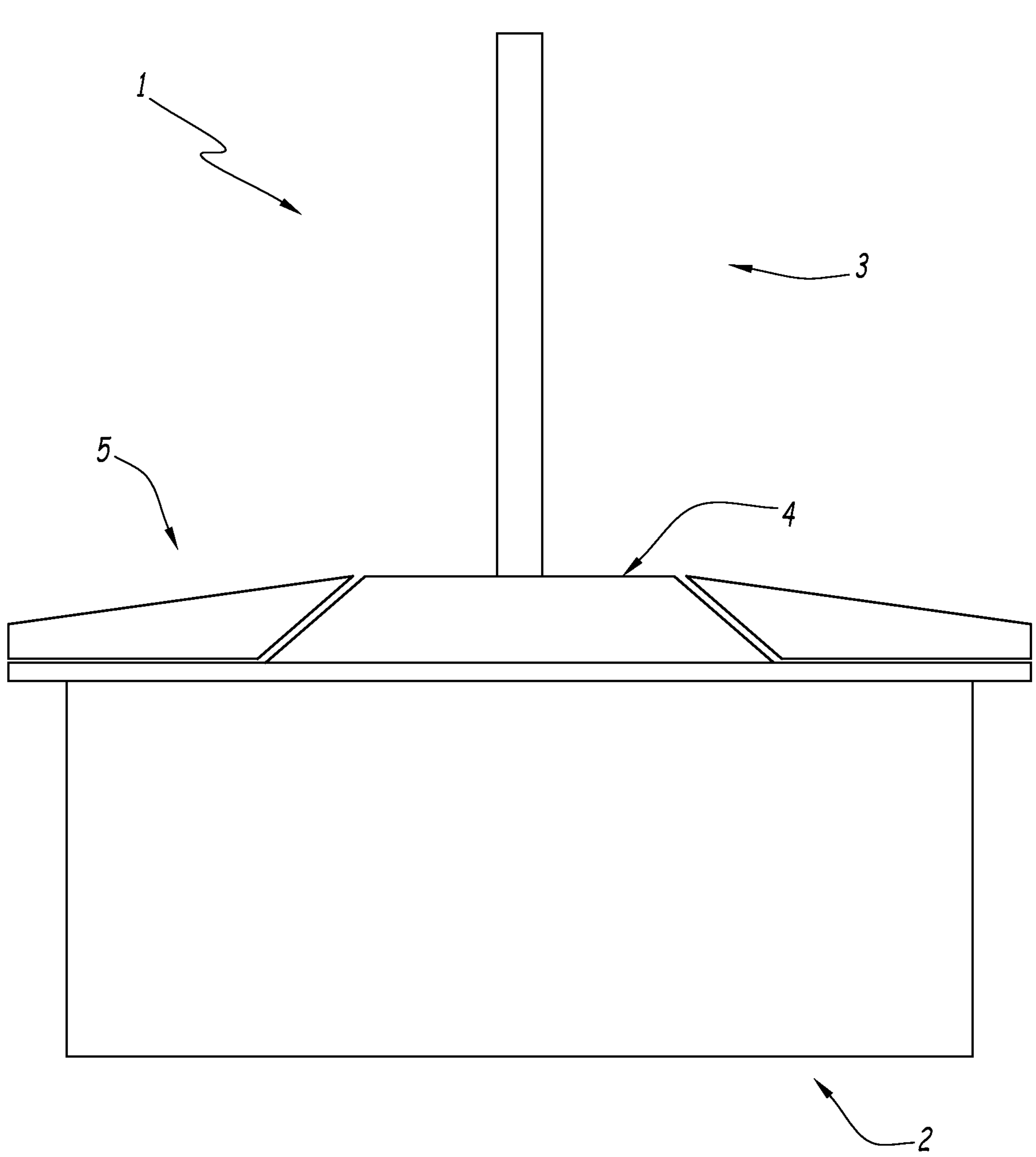

This comprises a sensor body designated by general reference 2, on which a wind vane designated by general reference 3 is mounted movable in rotation by a flow.

This wind vane 3 includes a base 4 associated with the sensor body, received in a corresponding housing and associated with a protection 5.

Notably, FIG. 1 shows the transonic flow around this wind vane.

Increasingly stringent environmental criteria for angle-of-attack sensors have led to the need to protect wind vane bases from supercooled water crystals and frost.

Intended to replace existing sensors on the current operational fleet of medium and long-haul aircraft, the sensors use the same interface as the aircraft.

For reasons of size and existing mechanical interface, the protection 5 of the wind vane base can result in a local protrusion on the fuselage line.

This protrusion results in a local acceleration of the flow, which can lead to the vane stalling.

To solve these problems, one or more deflectors are used in the incidence sensor according to the invention.

Figure 3:
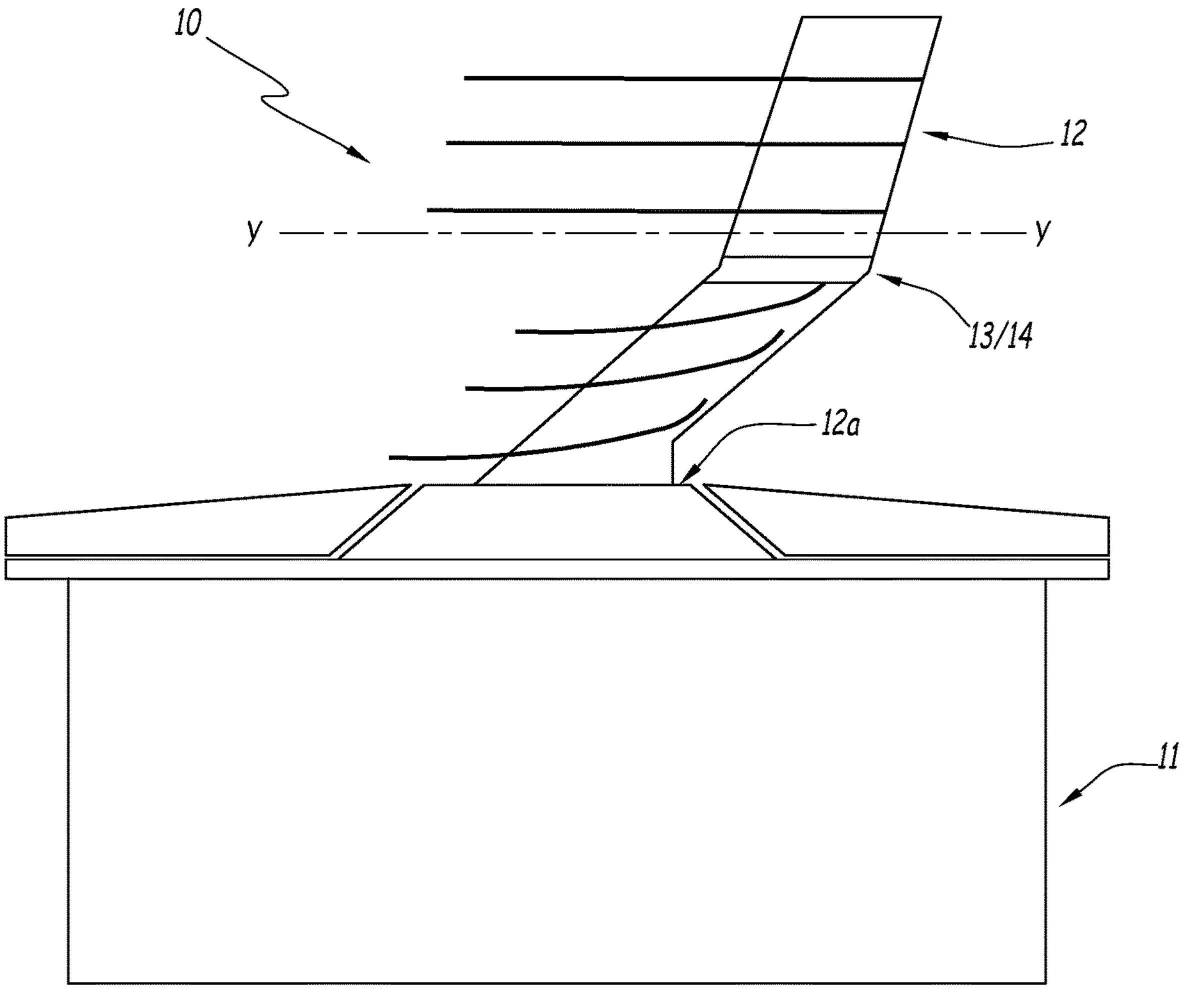
FIGS. 3 and 4 show side and front views respectively, of an angle-of-attack sensor according to the invention.
Figure 4:
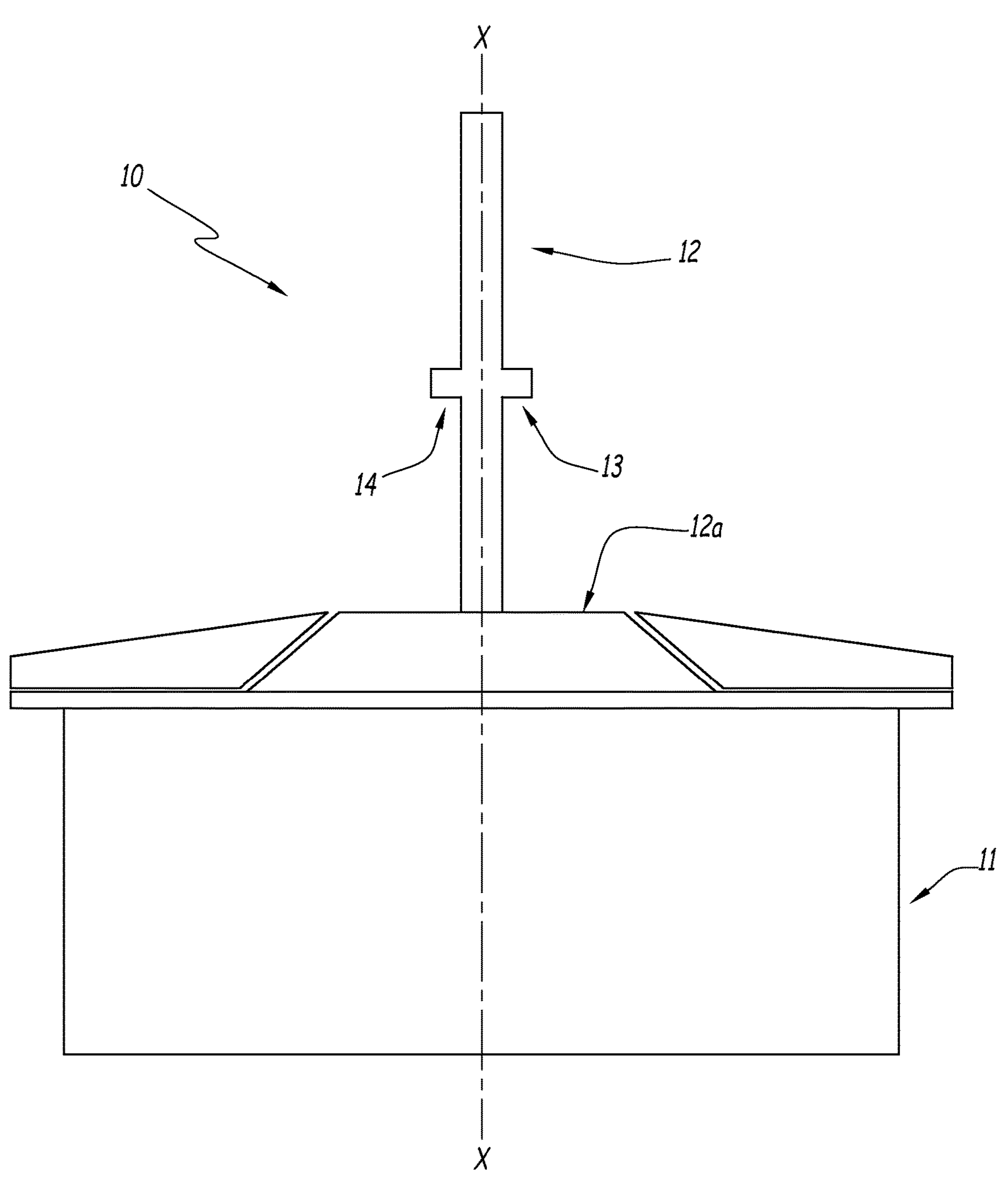

FIGS. 3 and 4 illustrate an angle-of-attack sensor according to the invention.

This is designated by the general reference 10 on these figures and comprises a sensor body 11 and a wind vane 12 with its base 12*a*.

As illustrated, this wind vane includes at least one deflector extending from the leading edge of the wind vane over at least part of its intrados and extrados. The leading edge is the part of the wind vane facing the direction of flow. It is opposite the trailing edge.

The or each deflector can extend in either direction according to the axis Y-Y from the leading edge toward the trailing edge and/or in the opposite direction.

In FIGS. 3 and 4, these deflectors are designated by the general references 13 and 14.

The deflector(s) are perpendicular to the plane of symmetry of the wind vane 12, in order to direct the fluid flow towards the trailing edge.

Indeed, and as illustrated, the vane 12 can therefore include at least one deflector on its intrados and extrados. The wind vane 12 may also include several deflectors parallel to each other and to the main axis of the flow Y-Y on its intrados and/or several on its extrados.

In this case, the deflector or deflectors extend over all or part of the wind vane chord.

The deflector(s) 13, 14 are spaced from the base 12*a* so that the flow passes in part between the base 12*a* and the said deflector(s).

The height of the wind vane (corresponding to the span) is defined according to the direction of elevation of the wind vane, an axis perpendicular to the direction of flow.

The or each deflector is spaced from the base 12*a* by a distance of between 1% and 100%, preferably between 10% and 90% and advantageously between 20% and 80%, of the height of the wind vane 12 according to an axis perpendicular to the flow direction X-X. The said at least one deflector is thus in a position suitable for straightening the flow. These values allow the flow to pass between the or each deflector, making the deflector operation efficient. In addition, these values ensure optimum stresses are applied to the wind vane.

The thickness of a deflector is defined according to the axis X-X, the height of a deflector is defined according to the direction orthogonal to the vane 12, and its length is defined according to the main flow direction Y-Y.

The thickness of said at least one deflector is notably less than 30%, advantageously less than 20%, even more advantageously less than 10% and preferably less than 1% of its length.

The height of said at least one deflector is notably between 2% and 150% of its length, preferably between 5% and 130% and advantageously between 10% and 100%.

The deflector(s) have a curved profile and therefore a thin thickness relative to the profile for aerodynamic purposes.

As also illustrated in FIG. 3, these deflectors act as flow straighteners and prevent the entire sensor canopy from suddenly stalling.

In the case of a canopy presenting a double swept wing, the deflectors must be positioned in such a way as to protect each different swept section.

Figure 5:
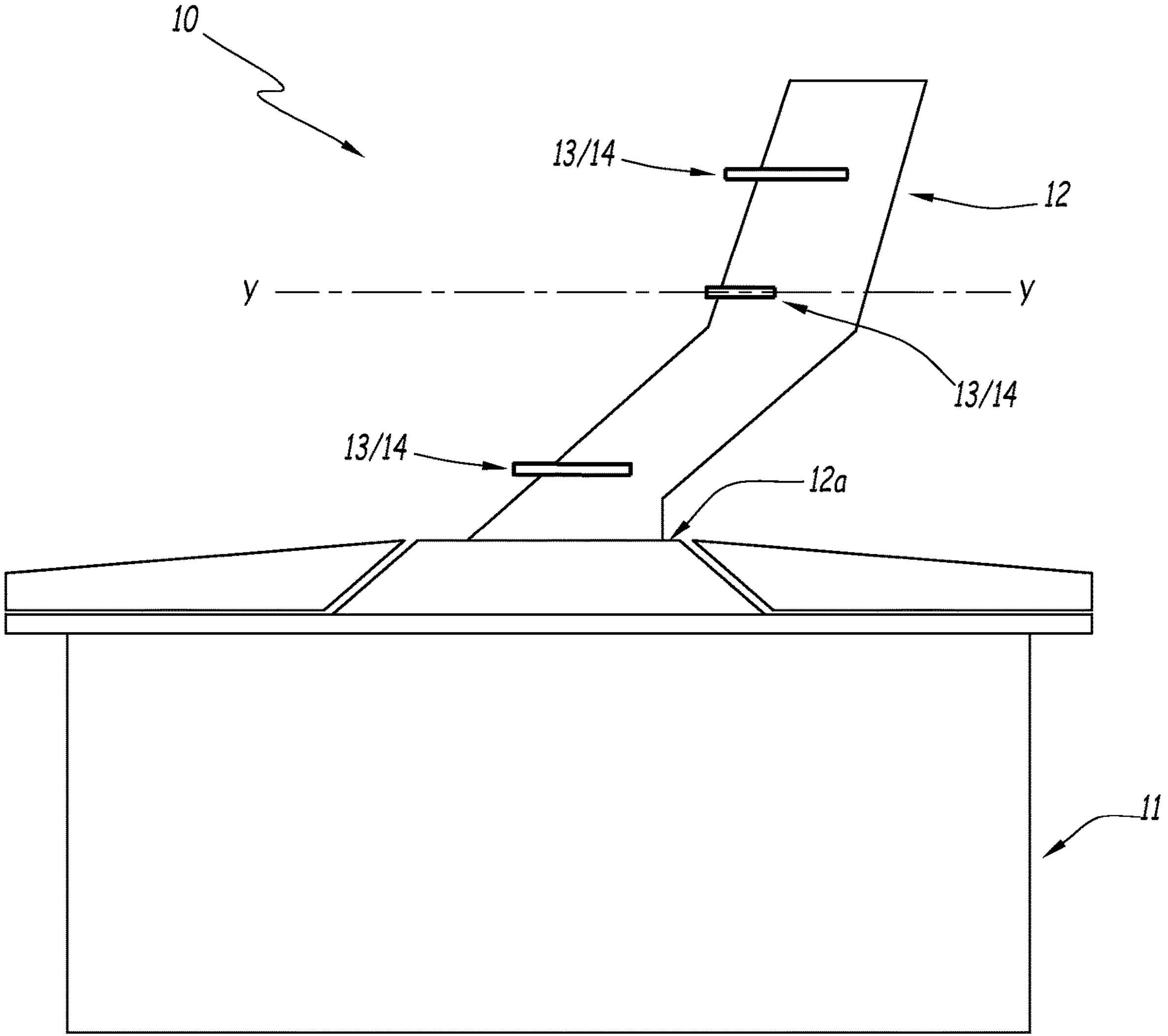
FIG. 5 shows a side view of an angle-of-attack sensor according to another embodiment.

In another embodiment, shown in FIG. 5, the wind vane 12 includes a number of deflectors 13, 14 on a portion of the intrados of the wind vane 12 and a number of deflectors 13, 14 on a portion of the extrados of the wind vane 12.

The deflectors extend in both directions from the leading edge, toward the trailing edge and in the opposite direction. In particular, the deflectors extend beyond the leading edge by between 25% and 50% of the length of the deflector according to the axis Y-Y. The embodiment is otherwise similar to the embodiment previously presented and represented in FIG. 3.

Figure 6:
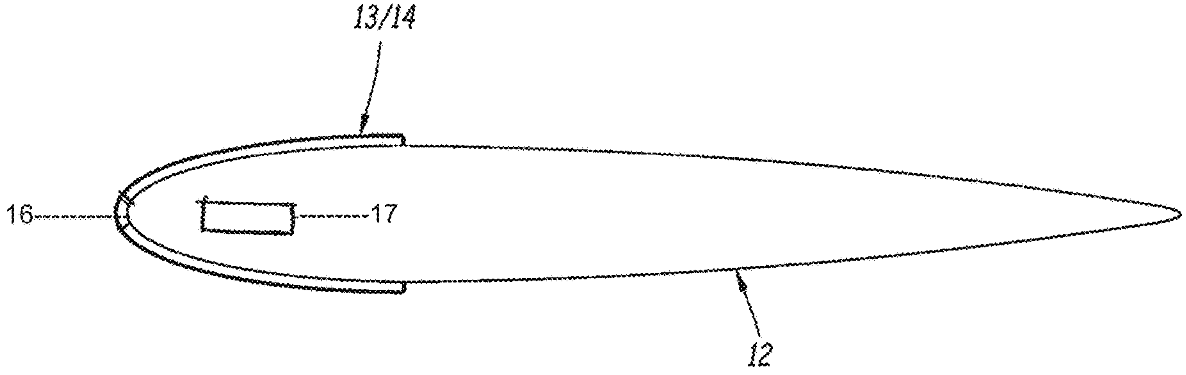
FIG. 6 shows a cross-sectional view according to the (Y-Y) axis of an angle-of-attack sensor according to the invention.

An example of a deflector is shown in FIG. 6. The wind vane 12 shown presents a more aerodynamic profile than that shown in FIGS. 3 and 4. The leading edge is then the end with the greatest radius of curvature. The deflectors 13 and 14 encircle the leading edge.

The wind vane 12 being symmetrical according to the axis X-X, the construction of the deflectors 13 and 14, which can be assimilated to a single deflector, meeting at the leading edge is advantageous for balancing the wind vane 12. This also avoids the build-up of stresses due to imbalance.

Furthermore, this sensor can also be associated with means for heating at least one of this or these deflector(s).

In fact, these reheating means for the deflector are associated with the reheating means for the sensor in a general way, these reheating means for the sensor and deflector, then being associated, for example, by thermal conduction.

This allows any accretion during passage through icy conditions to be avoided, for example.

Thus, the use of one or more heated deflectors allow to delay stall on a wind vane profile with insufficient deflection by locally straightening the flow.

FIG. 6 also shows an example of the wind vane 12, wherein the wind vane 12 comprises a deflector heating device 16 and a sensor heating device 17.

Of course, other embodiments of this sensor can also be envisaged.

The invention claimed is:

1. An angle-of-attack sensor for an aircraft, said sensor comprising a sensor body on which a wind vane is mounted movable in rotation by a flow, wherein the wind vane includes at least one deflector extending from a leading edge of the wind vane over at least part of an intrados and at least part of an extrados of the wind vane.

2. The angle-of-attack sensor according to claim 1, wherein said at least one deflector extends over all or part of a chord of the wind vane.

3. The angle-of-attack sensor according to claim 1, wherein said at least one deflector is perpendicular to a plane of symmetry of the wind vane.

4. The angle-of-attack sensor according to claim 1, wherein the sensor body includes a base on which the wind vane is mounted, said at least one deflector being spaced from the base.

5. The angle-of-attack sensor according to claim 1, wherein a thickness of said at least one deflector according to an axis perpendicular to a direction of the flow is less than 30% of its length thereof, according to the direction of the flow.

6. The angle-of-attack sensor according to claim 1, wherein a height of said at least deflector, according to a direction orthogonal to the wind vane is between 2% and 150% of a length thereof, according to the direction of the flow.

7. The angle-of-attack sensor according to claim 1, further comprising a deflector heating device for heating at least one of said at least one deflector.

8. The angle-of-attack sensor according to claim 7, wherein the deflector heating device is associated with a sensor heating device.

9. The angle-of-attack sensor according to claim 8, wherein the deflector heating device is associated with the sensor heating device by thermal conduction.

* * * * *